(12) United States Patent
Zhang et al.

(10) Patent No.: US 7,945,294 B2
(45) Date of Patent: *May 17, 2011

(54) APPARATUS AND METHOD FOR PROVIDING HANDS-FREE OPERATION OF A DEVICE

(75) Inventors: Lan Zhang, Duluth, GA (US); Joseph E. Page, Jr., Suwanee, GA (US); Barrett M. Kreiner, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 145 days.

This patent is subject to a terminal disclaimer.

(21) Appl. No.: 12/430,188

(22) Filed: Apr. 27, 2009

(65) Prior Publication Data

US 2009/0215503 A1 Aug. 27, 2009

Related U.S. Application Data

(63) Continuation of application No. 11/354,198, filed on Feb. 14, 2006, now Pat. No. 7,542,787, which is a continuation of application No. 10/253,213, filed on Sep. 24, 2002, now Pat. No. 7,027,842.

(51) Int. Cl.
*H04M 1/00* (2006.01)

(52) U.S. Cl. .......... 455/569.1; 455/557; 455/575.2; 455/413; 379/88.01; 704/208

(58) Field of Classification Search ........... 455/569.1, 455/557, 575.2, 413, 41.2, 418, 18; 379/88.01, 379/93.34, 100.08; 704/208, 275, 270
See application file for complete search history.

(56) References Cited

U.S. PATENT DOCUMENTS

| | | | |
|---|---|---|---|
| 3,617,640 A * | 11/1971 | Cichanowicz | 379/40 |
| 5,487,175 A * | 1/1996 | Bayley et al. | 455/422.1 |
| 5,584,054 A * | 12/1996 | Tyneski et al. | 455/566 |
| 5,726,984 A * | 3/1998 | Kubler et al. | 370/349 |
| 5,913,163 A * | 6/1999 | Johansson | 455/426.1 |
| 5,978,689 A * | 11/1999 | Tuoriniemi et al. | 455/569.1 |
| 6,122,486 A * | 9/2000 | Tanaka et al. | 455/68 |
| 6,223,029 B1 * | 4/2001 | Stenman et al. | 455/420 |
| 6,233,464 B1 * | 5/2001 | Chmaytelli | 455/556.2 |
| 6,339,706 B1 * | 1/2002 | Tillgren et al. | 455/419 |
| 6,487,240 B1 * | 11/2002 | Chen | 375/219 |
| 6,690,947 B1 * | 2/2004 | Tom | 455/556.1 |
| 6,748,244 B2 * | 6/2004 | Odinak | 455/569.2 |
| 2002/0016188 A1 * | 2/2002 | Kashiwamura | 455/568 |
| 2002/0025832 A1 * | 2/2002 | Durian et al. | 455/556 |
| 2002/0181691 A1 * | 12/2002 | Miller et al. | 379/234 |
| 2003/0022701 A1 * | 1/2003 | Gupta | 455/566 |
| 2003/0032449 A1 * | 2/2003 | Giobbi | 455/556 |
| 2004/0185915 A1 * | 9/2004 | Ihara et al. | 455/569.1 |
| 2004/0219954 A1 * | 11/2004 | Odinak | 455/569.1 |

* cited by examiner

*Primary Examiner* — Minh D Dao

(74) *Attorney, Agent, or Firm* — Scott P. Zimmerman PLLC

(57) ABSTRACT

The present invention provides an apparatus and method for providing hands-free operation of a device. A hands-free adapter is provided that communicates with a device and a headset. The hands-free adapter allows a user to use voice commands so that the user does not have to handle the device. The hands-free adapter receives voice commands from the headset and translates the voice commands to commands recognized by the device. The hands-free adapter also monitors the device to detect device events and provides notice of the events to the user via the headset.

20 Claims, 8 Drawing Sheets

|     | Voice Command | Device Command/Action |
| --- | --- | --- |
| 502 | Pick Up | Answer incoming call |
| 504 | Hang Up | Disconnect current call |
| 506 | Joe | XXX·XXX·XXXX |
|     | Hair Salon | YYY·YYY·YYYY |
| 508 | Dial | Wait for digits or voice command and dial |
| 510 | Ignore | Ignore event |
| 512 | Okay | Send |
| 514 | Voice Mail | Answer incoming call and send to voice mail |
| 516 | Create entry directory | Create new voice command |
| 518 | Sleep | Enter Sleep Mode |
| 520 | Wake Up | Exit Sleep Mode |

Figure 5

| Event | Event Indicator |
|---|---|
| Incoming call | Play "incoming call" announcement |
| Incoming call waiting | Play "incoming call waiting" announcement |

Figure 6

| Voice Command | Device Command/Action |
|---|---|
| Read | Open message and read it |
| Reply | Reply to message |
| Delete | Delete message |
| Joe | Joe@ipager.com |

Figure 7

| Event | Event Indicator |
|---|---|
| New message | Play "new message" announcement |

APPARATUS AND METHOD FOR PROVIDING HANDS-FREE OPERATION OF A DEVICE

CROSS-REFERENCE TO RELATED APPLICATIONS

This application is a continuation of U.S. application Ser. No. 11/354,198, filed Feb. 14, 2006, now issued as U.S. Pat. No. 7,542,787, which is itself a continuation of U.S. application Ser. No. 10/253,213, filed Sep. 24, 2002, now issued as U.S. Pat. No. 7,027,842, with both applications incorporated herein by reference in their entirety.

TECHNICAL FIELD

The present invention is directed in general to providing hands-free operation of a device, and in particular to providing voice commands that emulate a user's interaction with a device.

BACKGROUND

Mobile devices, such as mobile telephones, pagers and personal digital assistants ("PDAs"), have made it easier to reach users. Users of the devices typically carry the devices with them allowing a caller or sender to reach a user regardless of the user's location. However, there are times when a user misses a communication because interacting with the device is inconvenient or impossible. If a user is performing a task that requires both hands, then the user may not be able to interact with a device to receive a communication. For example, if a parent is grocery shopping with a couple of children, the parent may be using both hands to control the children and the grocery cart and may not be able to handle a mobile telephone to answer an incoming call. Similarly, if a mobile telephone is carried in a purse or a backpack, the user may not be able to locate and answer the telephone before the caller hangs up, especially if the user is also driving a vehicle when the telephone rings.

Although there are currently some solutions that allow a user to use a mobile telephone without having to hold the telephone, these solutions still require the user to interact with the telephone. For example, one solution provides a headset or a speakerphone function so that the user does not have to hold the mobile telephone during a conversation. However, the user is still required to interact with the mobile telephone to receive, end or initiate a telephone call.

Another solution is an auto-dialer that allows a user to dial a telephone number by speaking the number. However, most auto-dialers require that the user place a call using the keypad of the mobile telephone to a remote server. Typically the auto-dialing service is provided by a network element and the user is required to subscribe to the service before using the service.

Thus, there is a need for providing an apparatus and method that supports completely hands-free operation of a device.

SUMMARY

The present invention meets the needs described above by providing a hands-free adapter that supports hands-free operation of a device. Unlike other solutions that require the user to initially interact with the device, the hands-free adapter is active whenever the device is powered so that the hands-free adapter can be used to perform any function or command that is normally performed by the user interacting with the device.

The hands-free adapter includes a device interface for interfacing with the device. The device interface can be connected to a feature connector of a mobile telephone or another type of interface provided by a pager or personal digital assistant ("PDA"). The feature connector (or other interface) provides information about the status of the device and accepts commands and audio/data input.

The hands-free adapter also includes a non-volatile memory. The non-volatile memory stores a command prefix, voice commands and event indicators. A command prefix is a word that identifies a subsequent word as a command. Typically, the command prefix is a word that is not commonly used in conversation. A voice command is a command selected by the user for controlling the device. An event indicator is an indicator selected by the user for receiving information about the device. An example of an event indicator is a special tone or "sparkle" that is played when the device receives an incoming call. The non-volatile memory also stores the software needed to operate the hands-free adapter, such as voice recognition software.

In addition, the hands-free adapter includes a digital signal processor ("DSP") and a headset interface. The DSP and the headset interface process audio received from the headset and provide audio to the headset. The audio signals received from the headset are processed by the DSP to detect voice commands. If the audio signals are part of a telephone conversation, then the audio signals are passed through to the device. However, if the audio signals correspond to a voice command, then the voice command is recognized by the DSP and is processed accordingly. The DSP and headset interface also provide event indicators to the headset. If the user selects an event indicator message that requires the generation of speech, then the DSP performs the voice synthesis. The interface between the hands-free adapter and the headset can be a wireless or a wired interface.

The hands-free adapter may include an optional computer interface. The computer interface allows the hands-free adapter to communicate with a computer using any of a variety of well-known protocols. The computer interface may be used to configure and "train" the hands-free adapter for voice recognition. The computer interface may also be used to transfer user preference information from one hands-free adapter to another hands-free adapter, to back up the user preference information or to upgrade the features of the hands-free adapter. Configuration of the hands-free adapter includes programming user preferences into the non-volatile memory. User preferences include a personal directory that associates an identifier, such as a name, with a destination, such as a telephone number or pager address. User preferences also include the selection of other voice commands and event indicators.

The hands-free adapter can be connected to the device using a wired or a wireless interface. The hands-free adapter can be a separate device that is connected to the device or can be integrated into the device. The headset used with the hands-free adapter includes a speaker and a microphone. The headset can be a conventional headset or can be integrated into another article, such as a pair of glasses, a glasses' strap, a hat, or a vehicle.

The hands-free adapter monitors the device via the device interface. Whenever the hands-free adapter detects a device event, the hands-free adapter notifies the user by sending an event indicator to the headset. The event indicator can be a message, such as a message previously recorded by the user or a standard message, or a tone or series of tones. The event indicator is overlaid on any existing audio and is only played to the user.

The hands-free adapter monitors the headset via the headset interface. Whenever the hands-free adapter detects a command, the hands-free adapter provides a device command to the device. A command prefix is used in addition to a voice command so that the user does not inadvertently cause the device to perform an unintended action. The command prefix can be provided by the manufacturer or selected by the user. The command prefix is typically a word that the user does not use in conversation. To issue a command, the user says both the command prefix and a command. When the hands-free adapter detects the command prefix, the hands-free adapter treats the next word as a command. In addition, if the hands-free adapter is passing audio signals from the headset to the device, then the hands-free adapter mutes the audio to the device, so that the voice command is not provided to the device. The command prefix allows the user to use a voice command in conversation without triggering a device command because the voice command is only effective if the voice command is preceded by the command prefix. Alternatively, the hands-free adapter can use context to recognize a command without the use of a command prefix.

The hands-free adapter can also provide additional functions to the user. For example, a hands-free adapter for a mobile telephone can provide caller identification and voice mail to the user. If the hands-free adapter detects an incoming call from one of the telephone numbers stored in its memory, then the hands-free adapter identifies the caller to the user. Voice mail can be provided using the DSP and memory of the hands-free adapter. The user can send an incoming call to voice mail, rather than answer the call. If so, then the hands-free adapter plays an outgoing announcement to the caller and records a message from the caller.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIG. 5 is a block diagram illustrating the mapping between a voice command and a device command in accordance with an embodiment of the invention.

FIG. 6 is a block diagram illustrating the mapping between a device event and an event indicator in accordance with an embodiment of the invention.

FIG. 7 is a block diagram illustrating the mapping between a voice command and a device command in accordance with another embodiment of the invention.

FIG. 8 is a block diagram illustrating the mapping between a device event and an event indicator in accordance with another embodiment of the invention.

DETAILED DESCRIPTION

The present invention is directed to an apparatus and method for providing hands-free operation of a device. Briefly described, the invention provides a hands-free adapter that communicates with a device and a headset. The hands-free adapter allows a user to use voice commands so that the user does not have to handle the device. The hands-free adapter receives voice commands from the headset and translates the voice commands to commands recognized by the device. The hands-free adapter also monitors the device to detect device events and provides notice of the events to the user via the headset.

Figure 1:
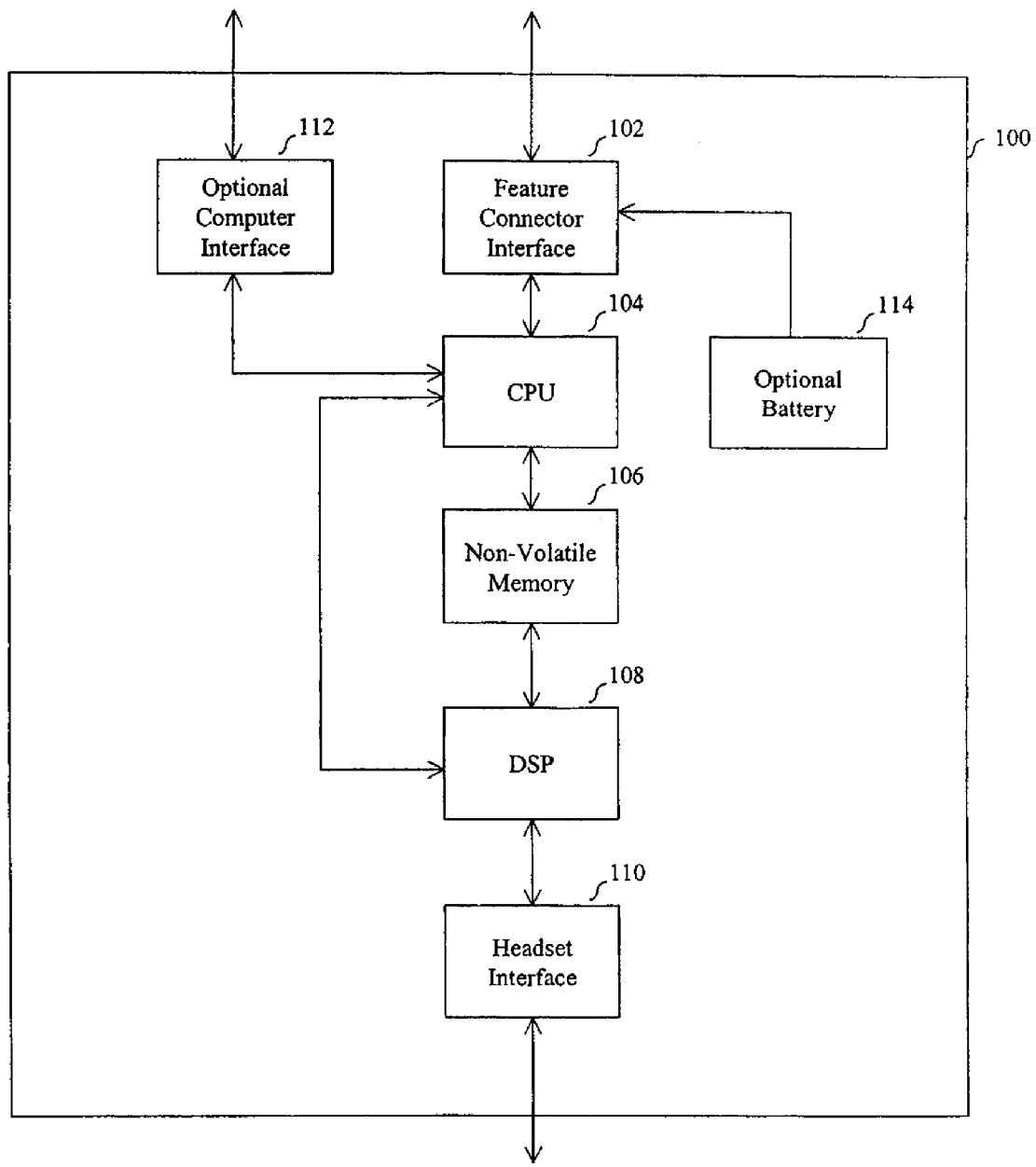
FIG. 1 is a block diagram of a hands-free adapter in accordance with an embodiment of the invention.

FIG. 1 illustrates the main functional blocks of an exemplary hands-free adapter 100. The hands-free adapter includes a device interface 102 for interfacing with the device. The device interface shown in FIG. 1 is a feature connector interface for interfacing with a mobile telephone. The terms device interface and feature connector interface are used interchangeably herein.

Most mobile telephones include a feature connector. The feature connector provides signals that indicate the status of the mobile telephone, such as incoming call pending, etc. The feature connector also provides the audio signals received by the mobile telephone. The feature connector accepts audio signals from the hands-free adapter and the mobile telephone processes the input audio signals in the same manner that it would process audio signals received from the microphone built into the mobile telephone. The feature connector also receives commands from the hands-free adapter and the mobile telephone processes the commands in the same manner that it would process commands received from the keypad built into the mobile telephone. The feature connector also includes a power connection so that the mobile telephone can be powered via the power connection. Although most mobile telephones include a feature connector, the physical configuration of the feature connector and/or the communication protocol used by the feature connector may vary by model and/or manufacturer. Therefore, the feature connector interface 102 shown in FIG. 1 is designed for use with a particular manufacturer's device.

If the hands-free adapter interfaces with a wire line telephone, a pager or a personal digital assistant ("PDA"), then in one embodiment, the hands-free adapter is integrated into the device and the device interface is not needed. In another embodiment, the hands-free adapter connects to an external interface of the pager or PDA.

In addition, to the device interface 102, the hands-free adapter includes a CPU 104, non-volatile memory 106, a digital signal processor 108 and a headset interface 110. The non-volatile memory stores a command prefix, voice commands and event indicators. A command prefix is a word that identifies a subsequent word as a command. Typically, the command prefix is a word that is not commonly used in conversation, such as "Goober." A voice command is a command selected by the user for controlling the device. An example of a voice command is "Pick-up". When the user says "Goober, Pick-up" the hands-free adapter sends a device command to the device to answer the incoming call. An event indicator is an indicator selected by the user for receiving information about the device. An example of an event indicator is a special tone or "sparkle" that is played when the device receives an incoming call. The non-volatile memory also stores the software needed to operate the hands-free adapter, such as voice recognition software.

The DSP 108 and the headset interface 110 interface the hands-free adapter with a headset. The hands-free adapter provides audio signals to the headset. For example, if the hands-free adapter is connected to a mobile telephone, then the audio signals received by the telephone in connection with an incoming call are forwarded to the headset. If the hands-free adapter is connected to a pager or a PDA, then the text messages received by the device are converted to audio signals and forwarded to the headset. The DSP and headset interface also provide event indicators to the headset. If the user selects an event indicator message that requires the generation of speech, then the DSP performs the voice synthesis.

The audio signals received from the headset are processed by the DSP. If the audio signals are part of a telephone conversation, then the audio signals are passed through to the device. However, if the audio signals correspond to a voice command, then the voice command is recognized by the DSP and is processed accordingly. In one embodiment, the interface between the hands-free adapter and the headset is a wireless interface, such as the BLUETOOTH interface. In another embodiment, the interface is a wired interface.

The hands-free adapter shown in FIG. 1 includes an optional computer interface 112. The computer interface 112 allows the hands-free adapter to communicate with a computer using any of a variety of well-known protocols. The computer interface may be used to configure and "train" the hands-free adapter for voice recognition. In one embodiment, the voice recognition function of the hands-free adapter are user-dependent and require training to recognize the voice commands issued by the user. In another embodiment, the voice recognition function is user-independent. Alternatively, the device interface can be used instead of the computer interface to interface the hands-free adapter to the computer.

The computer interface (or device interface) can be used to configure the hands-free adapter. Configuration typically includes selecting features and programming user preferences into the non-volatile memory. Configuration may also include the selection of a language so that the hands-free adapter is programmed to operate with a particular language. Features include voice mail and caller identification. User preferences include voice commands and event indicators. The hands-free adapter supports voice commands for creating a personal directory so that the user can associate an identifier, such as a name, with a destination, such as a telephone number or electronic address, such as a pager or e-mail address. The computer interface can also be used to transfer user preference information from one hands-free adapter to another hands-free adapter, back up the user preference information, or add new features to the hands-free adapter.

An optional battery 114 is shown in the hands-free adapter of FIG. 1. The hands-free adapter is operational whenever the device is powered. The hands-free adapter can share a battery or other power source used by the device or use the battery 114. In one embodiment, the battery 114 provides power to the hands-free adapter and provides a back-up power source for the device. In this embodiment, if the device is a mobile telephone, then the hands-free adapter may be built into a battery pack.

The components shown in FIG. 1 are exemplary. Additional and/or alternative components can also be used. Although separate components are shown in FIG. 1, the components may be integrated into one or more components. For example, Motorola provides the MC9328MX1 processor that includes a microprocessor, memory controller, BLUETOOTH accelerator and multimedia accelerator that could be used in the hands-free adapter.

Figure 2:
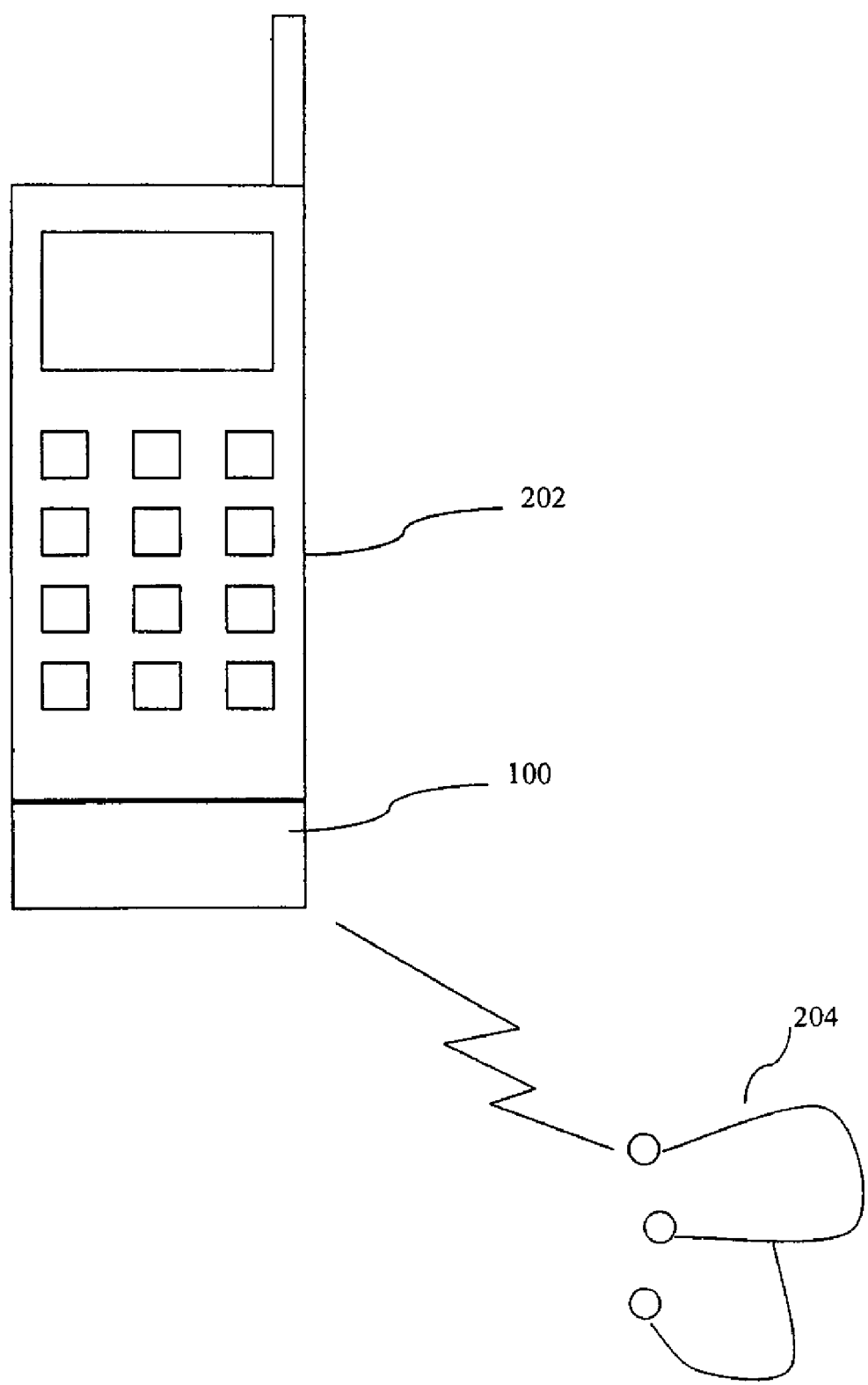
FIG. 2 is a block diagram of a hands-free adapter, a device and a headset in accordance with an embodiment of the invention.

FIG. 2 illustrates the hands-free adapter 100 connected to a mobile telephone 202 via the feature connector of the mobile telephone. Although the interface between the device and the hands-free adapter is shown as a wired interface in FIG. 2, the interface can be a wireless interface. The hands-free adapter also communicates with a headset 204. The headset includes a speaker and a microphone. The headset can be a conventional headset or can be integrated into another article, such as a pair of glasses, a glasses' strap, a hat, or a vehicle. If the headset is integrated into a vehicle, then the vehicle may provide a docking station for the device and a microphone and use the existing speakers provided by the audio system. In one embodiment, the hands-free adapter is integrated into the headset.

If the hands-free adapter is used with a landline telephone, then the hands-free adapter is typically connected to the landline telephone as either an add-on component or an integrated component. In one embodiment, the hands-free adapter is integrated into the base of a cordless landline telephone.

The hands-free adapter is powered whenever the device is powered so that the hands-free adapter can be used to perform any function or command that is normally performed by a user interacting with the device. The hands-free adapter monitors the device via the device interface and monitors the headset via the headset interface. Whenever the hands-free adapter detects a device event, the hands-free adapter notifies the user by sending an event indicator to the headset. The event indicator can be a message, such as a message previously recorded by the user during configuration or a standard message, or a tone or series of tones. For example, a message stating "Incoming call" can be used to alert the user to an incoming call. Alternatively, a particular tone or "sparkle" can be used to alert the user to an incoming call. The event indicator is overlaid on any existing audio and is only played to the user. For example, if the user is participating in a telephone conversation when the hands-free adapter detects an event, such as incoming call waiting, then the event indicator is provided to the user and is not detectable by the original caller.

The hands-free adapter does not modify any of the device settings. Therefore, if the device is a mobile telephone and the ringer is activated, then the telephone rings whenever an incoming call is received. In addition, the hands-free adapter sends an incoming call alert to the user via the headset. The hands-free adapter also does not disable the keypad. Therefore, the user can use either the headset or the keypad depending upon which is most convenient.

In one embodiment, a toggle switch is provided on the headset to allow the user to send a command to the device. The toggle switch allows the user to answer an incoming call or to disconnect from a call. The toggle switch may be useful in a noisy environment where a voice command may not be easily recognized.

A command prefix is used in addition to a voice command so that a user does not inadvertently cause the device to perform an unintended action. The command prefix is provided by the manufacturer or selected by the user. The command prefix is typically a word that the user does not use in conversation. To issue a command, the user says both the command prefix and a command. The command prefix can be selected during configuration of the hands-free adapter. When the hands-free adapter detects the command prefix, the hands-free adapter treats the next word as a command. In addition, if the hands-free adapter is passing audio signals from the headset to the device, then the hands-free adapter mutes the audio to the device, so that the voice command is not provided to the device. For example, if the user selects "Goober" as the command prefix, then the user says "Goober" before each voice command. This allows the user to use a voice command in conversation without triggering a device command because the voice command is only effective if the voice command is preceded by the command prefix. Thus, if "Hang up" is a voice command to disconnect a call, then the user says "Goober, Hang up" to hang up the device. Conversely, if the user uses the phrase, "hang up" in normal conversation without the command prefix, then the hands-free adapter does not interpret "hang-up" as a voice command.

In one embodiment, a command prefix is not required for all commands. In this embodiment, the hands-free adapter uses context to recognize a command. For example, if an incoming call is detected, then the hands-free adapter expects to receive a voice command. If the user says "Pick up," then the hands-free adapter interprets the input as a command and instructs the mobile telephone to answer the call.

Figure 3:
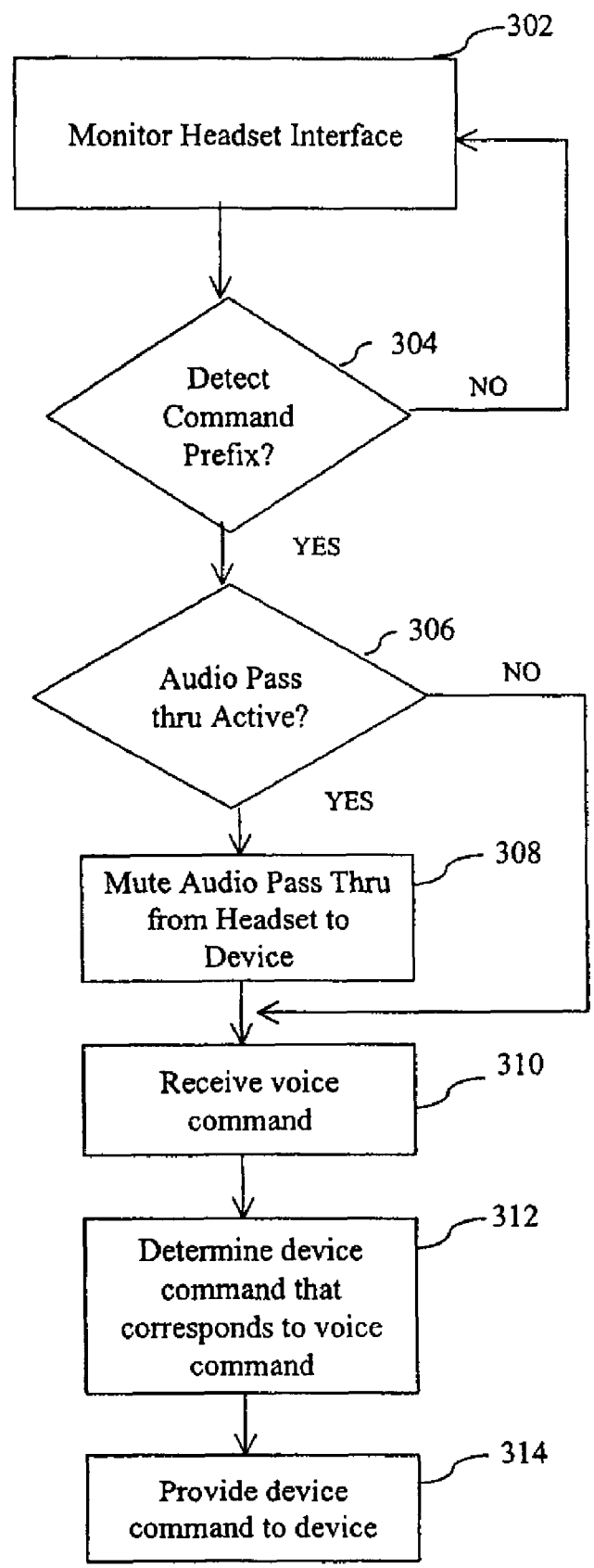
FIG. 3 is a flow diagram illustrating a method for generating a device command in accordance with an embodiment of the invention.

FIG. 3 illustrates an exemplary method for handling voice commands. In step 302, the hands-free adapter monitors the headset interface for audio signals. As audio signals are received, the hands-free adapter analyzes the audio signals in step 304 to determine whether the audio signals correspond to a command prefix. If a command prefix is not detected, then the No branch is followed to step 302 and the hands-free adapter continues to monitor the audio signals received from the headset. If a command prefix is detected, then the Yes branch is followed to step 306.

In step 306, a determination is made as to whether audio signals are being passed from the headset to the device. For example, if the device is a mobile telephone, then audio signals are passed from the headset to the mobile telephone during a telephone conversation. If audio signals are being passed to the device, then the Yes branch is followed to step 308 and the audio signals are muted in step 308 so that the voice command is not forwarded to the device. From step 308, the method proceeds to step 310. If the determination in step 306 is that audio signals are not being passed to the device, then the No branch is followed to step 310. In step 310, the hands-free adapter receives the voice command. The hands-free adapter determines the device command that corresponds to the voice command in step 312 and then sends the device command to the device via the device interface in step 314.

Figure 4:
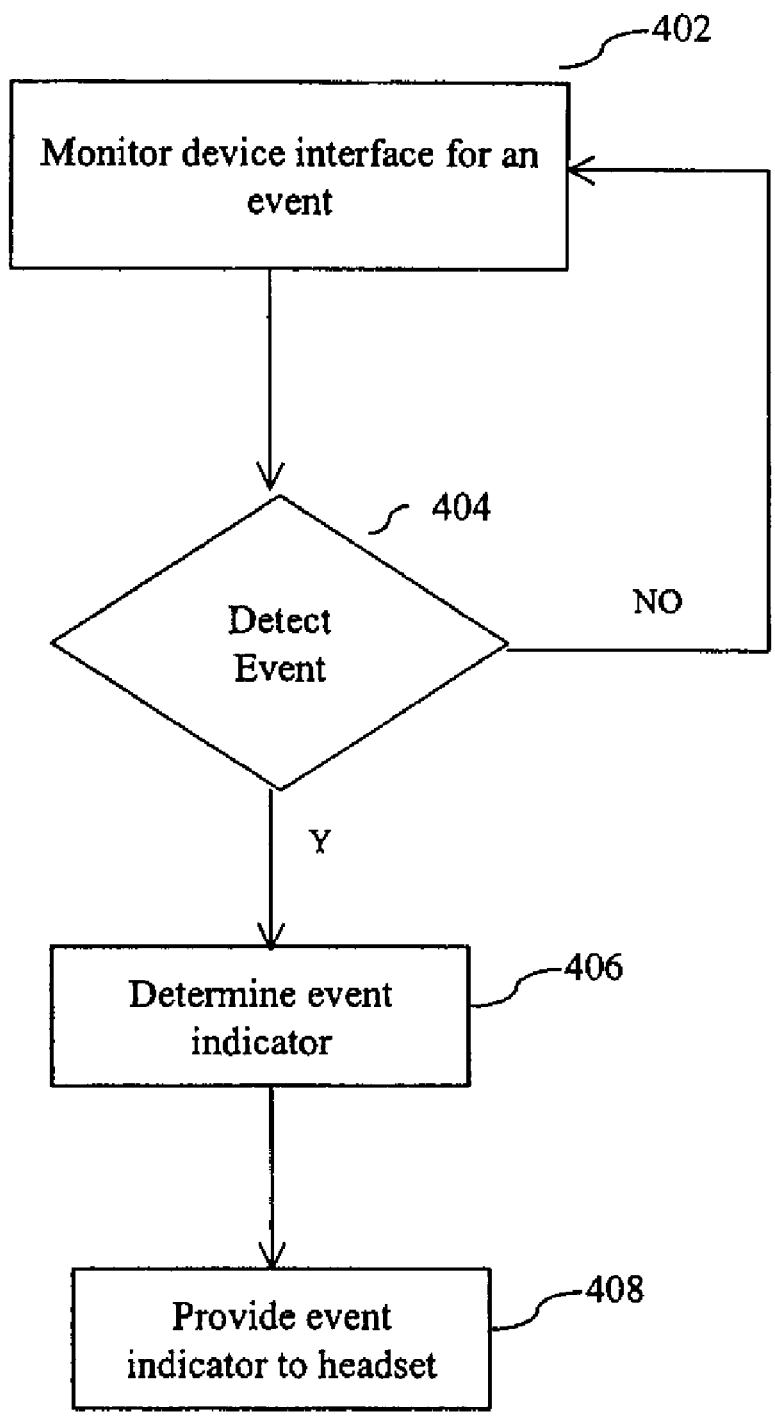
FIG. 4 is a flow diagram illustrating a method for providing an event indicator in accordance with an embodiment of the invention.

FIG. 4 illustrates an exemplary method for providing event indicators. The hands-free adapter monitors the device interface for an event in step 402. Typically, the events are predefined. For example, if the device is a mobile telephone, then the feature connector is monitored to detect an incoming call. If an event is not detected in step 404, then the No branch is followed to step 402 and monitoring continues. If an event is detected in step 404, then the Yes branch is followed to step 406. In step 406, an event indicator is determined. Typically, the user selects the event indicator during configuration of the hands-free adapter and the event indicator is stored in the memory of the hands-free adapter. Once the event indicator is determined, the hands-free adapter provides the event indicator to the headset via the headset interface in step 408.

FIG. 5 illustrates some exemplary voice commands for a hands-free adapter for a mobile telephone. As discussed above, the voice commands typically are selected by the user during configuration of the hands-free adapter and stored in memory. The "Pick up" command 502 instructs the hands-free adapter to generate a command to the mobile telephone to answer an incoming call. The "Hang-up" command 504 instructs the hands-free adapter to generate a command to the mobile telephone to disconnect a call.

The "Joe" command 506 instructs the hands-free adapter to generate a command to the mobile telephone to dial XXX.XXX.XXXX. The "Hair Salon" command 508 instructs the hands-free adapter to generate a command to the mobile telephone to dial YYY.YYY.YYYY. The entries for "Joe" and "Hair Salon" correspond to the user's personal directory. The user can select a voice command that identifies a person or business and corresponds to a telephone number, such as "Joe"—XXX.XXX.XXXX or "Hair Salon"—YYY.YYY.YYYY. The user uses these voice commands in combination with another voice command, such as "Dial" to place a call. For example, if the user says, "Goober, Dial Joe," then the hands-free adapter generates a device command that cause the device to place a call to XXX.XXX.XXXX. If the hands-free adapter detects an incoming call from one of the telephone numbers stored in its memory, then the hands-free adapter identifies the caller to the user. For example, if the event indicator for an incoming call is "Incoming call," then an incoming call from XXX.XXX.XXXX is announced as "Incoming call from Joe."

The user may refer to the same person or business using multiple identifiers. For example, the user may refer to Joe, as Joe and Joey. If so, then the "Joey" command may be a separate command or may be a pointer to the "Joe" command.

The "Dial" command 510 instructs the hands-free adapter to wait for digits or a voice command and to generate a command to the mobile telephone to place an outgoing call. The "Ignore" command 512 instructs the hands-free adapter to ignore the event so that no device command is generated. For example, the user may not want to answer an incoming call. If so, then when the hands-free adapter notifies the user of the incoming call, the user says "Ignore" and the hands-free adapter does not provide any additional notifications of the incoming call or provide a device command to the mobile telephone.

The "Okay" command 514 instructs the hands-free adapter to generate a send command to the mobile telephone device. The "Okay" command can be used to indicate that a dialing sequence is complete. For example, the user can dial a seven-digit number by saying, "Goober, Dial ZZZ.ZZZZ, Okay" or dial a ten-digit number by saying "Goober, Dial ZZZ.ZZZ.ZZZZ, Okay."

In one embodiment, the "Okay" command is used to confirm dialing instructions. For example, the user provides dialing instructions to the hands-free adapter by saying, "Goober, Dial ZZZ.ZZZ.ZZZZ, Okay." In response, the hands-free adapter provides a dialing confirmation messages, such as "Dialing ZZZ.ZZZ.ZZZZ." The user confirms the dialing instructions by saying, "Goober, Okay." Once the user confirms the dialing instructions the hands-free adapter provides the dialed number and a send command to the mobile telephone. If the user does not want to place the call, then the user does not respond and the hands-free adapter does not send the digits to the mobile telephone.

If the number being dialed is in the personal directory, then the hands-free adapter can use the personal directory to identify the person or business that is being called. For example, if the user says, "Goober, Dial XXX.XXX.XXXX," then the hands-free adapter can provide a dialing confirmation message of "Dialing Joe."

The "Voice Mail" command 514 is used with the voice mail provided by the hands-free adapter. The "Voice Mail" command instructs the hands-free adapter to generate a command to the mobile telephone to answer an incoming call. However, instead of the user participating in the call, the hands-free adapter plays an outgoing announcement to the caller and records a message from the caller. The "Voice Mail" command provides voice mail to the user regardless of the availability of network voice mail. If voice mail is provided, then additional voice mail commands (not shown) are also needed to access the voice mail functions. For example, commands to play a message and delete a message are needed.

The "Create Directory Entry" command 516 is used to create a new voice command that corresponds to the user's personal directory. For example, if the user says, "Goober, create directory entry for Susan ZZZ.ZZZ.ZZZZ," then the hands-free adapter creates a new voice command "Susan" that corresponds to ZZZ.ZZZ.ZZZZ.

The "Sleep" command 518 is used to place the hands-free adapter in sleep mode. While in sleep mode, the hands-free adapter does not provide any event indicators. Sleep mode may be used when the user does not want to be interrupted. The "Wake up" command 520 is used to place the hands-free adapter in its normal mode. Voice commands other than those illustrated in FIG. 5 are possible. For example, a voice command or a set of voice commands to support three-way calling can be included.

FIG. 6 illustrates some exemplary event indicators for a hands-free adapter for a mobile telephone. As discussed above, the event indicators typically are selected by the user during configuration of the hands-free adapter and stored in memory. The "Incoming call" event 602 instructs the hands-free adapter to play a message that states, "Incoming call" when the hands-free adapter detects that there is an incoming call on the mobile telephone. Typically, the incoming call message is played every time that the hands-free adapter detects a ring tone. The "Incoming call waiting" event 604 instructs the hands-free adapter to play a message that states, "Incoming call waiting" when the hands-free adapter detects that there is an incoming call waiting on the mobile telephone. Although not shown in FIG. 6, if the hands-free adapter provides voice mail, then an event indicator indicating the receipt of a message may also be included.

FIG. 7 illustrates some exemplary voice commands for a hands-free adapter for an interactive pager, PDA or SMS enabled mobile telephone. The "Read" command 702 instructs the hands-free adapter to retrieve a message from the pager and to play or read the message to the user. The "Reply" command 704 instructs the hands-free adapter to generate a command to the pager to send a reply message. The user provides the text of the reply message. For example, the user says, "Goober, Reply yes" to send a reply message that states "Yes." The "Delete command 706 instructs the hands-free adapter to generate a delete command to the pager to delete a message. The "Joe" command 708 instructs the hands-free adapter to generate a command to the pager to send a message to joe@ipager.com. The user supplies the text for the message. The user can create a personal directory of pager addresses in a manner similar to that described above in connection with a personal directory of telephone addresses. The personal directory can be used by the hands-free adapter to announce that a "New message from Joe" has been received.

FIG. 8 illustrates some exemplary event indicators for a hands-free adapter for an interactive pager, PDA or SMS enabled mobile telephone. The "New Message" event 802 instructs the hands-free adapter to play a message that states, "New message" when the hands-free device adapter that a new message has been received by the pager.

Additional alternative embodiments will be apparent to those skilled in the art to which the present invention pertains without departing from its spirit and scope. Accordingly, the scope of the present invention is described by the appended claims and is supported by the foregoing description.

What is claimed is:

1. A method for providing hands-free operation of a communications device, comprising:
   detecting a command prefix and a subsequently spoken voicemail command;
   generating a device command that emulates an interaction of a user with the communication device to answer an incoming call;
   providing the device command to the communication device; and
   playing an outgoing announcement to a caller.

2. The method according to claim 1, further comprising recording a message from the caller in response to the spoken voicemail command.

3. The method according to claim 1, further comprising interfacing with a headset.

4. The method according to claim 3, further comprising processing audio signals from the headset.

5. The method according to claim 3, further comprising passing audio signals to the communications device.

6. The method according to claim 1, further comprising interfacing with a mobile phone.

7. The method according to claim 1, further comprising playing a tone when the incoming call is received.

8. The method according to claim 1, further comprising detecting an event.

9. The method according to claim 8, further comprising generating an event indicator.

10. The method according to claim 9, further comprising overlaying the event indicator onto an audio signal.

11. The method according to claim 8, further comprising providing the event indicator to a headset.

12. The method according to claim 1, further comprising interfacing with a computer.

13. The method according to claim 1, further comprising wirelessly interfacing with the communications device.

14. A system providing hands-free operation of a communications device, comprising:
   a processor executing code stored in memory that causes the processor to:
   detect a command prefix and a subsequently spoken voicemail command;
   generate a device command that emulates an interaction of a user with the communication device to answer an incoming call;
   provide the device command to the communication device; and
   play an outgoing announcement to a caller.

15. The system according to claim 14, wherein the code further causes the processor to record a message from the caller.

16. The system according to claim 14, wherein the code further causes the processor to interface with a headset.

17. The system according to claim 16, wherein the code further causes the processor to process audio signals from the headset.

18. The system according to claim 16, wherein the code further causes the processor to pass audio signals to the communications device.

19. The system according to claim 14, wherein the code further causes the processor to interface with a mobile phone.

20. A storage medium encoded with instructions for performing a method, the method comprising:
   detecting a command prefix and a subsequently spoken voicemail command;
   generating a device command that emulates an interaction of a user with the communication device to answer an incoming call;
   providing the device command to the communication device; and
   playing an outgoing announcement to a caller.

* * * * *